April 16, 1935.  L. C. COLE  1,997,810
MACHINE TOOL
Filed Feb. 8, 1932  6 Sheets-Sheet 1

Inventor
Lyndon C. Cole
By Maréchal & Noé
Attorney

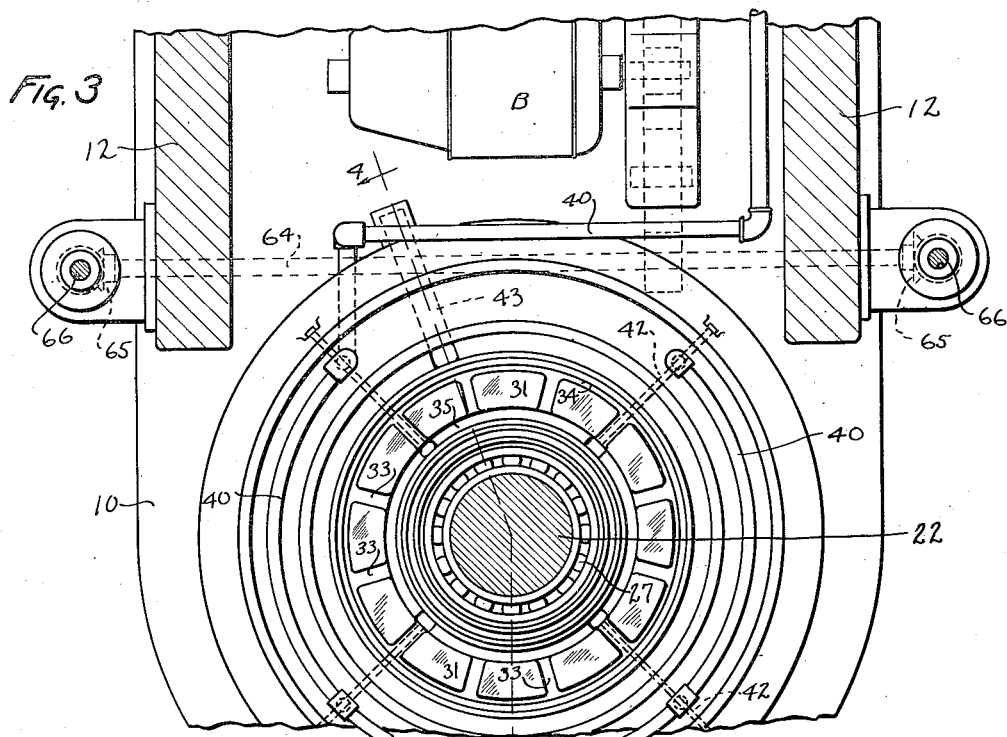

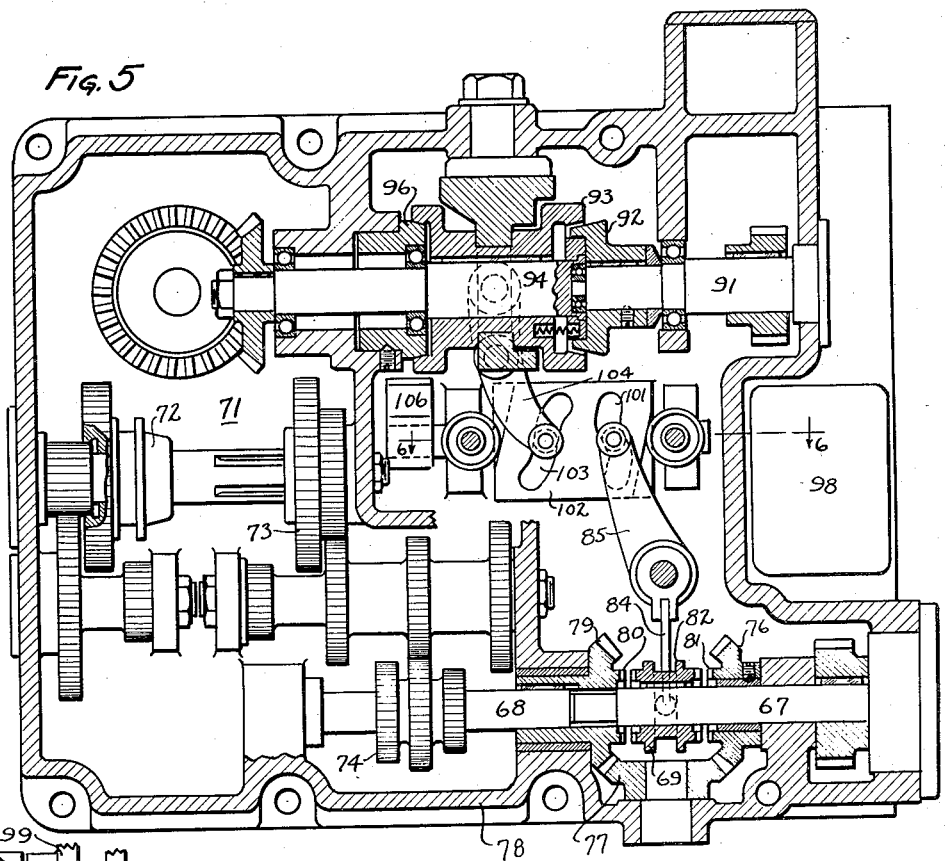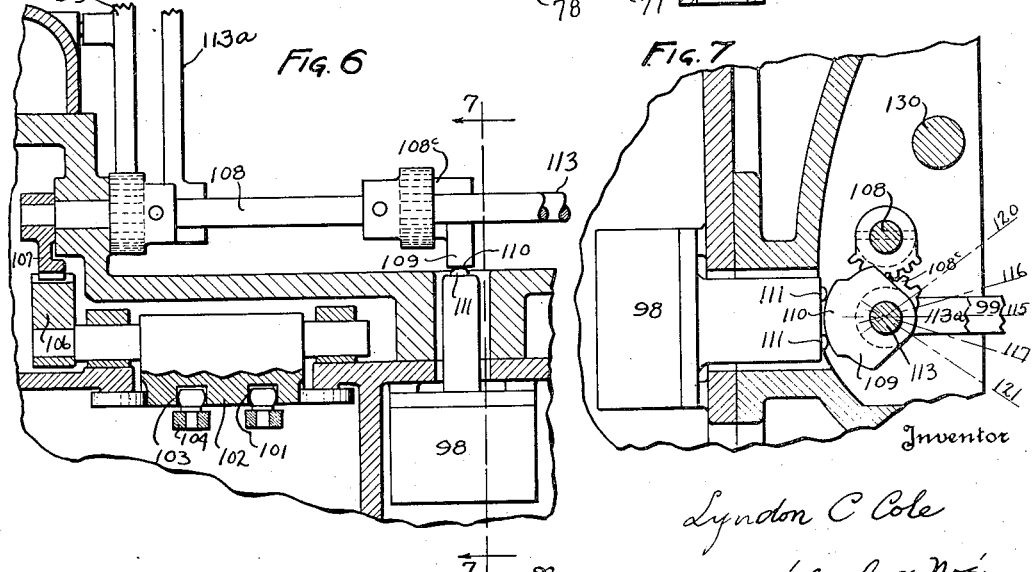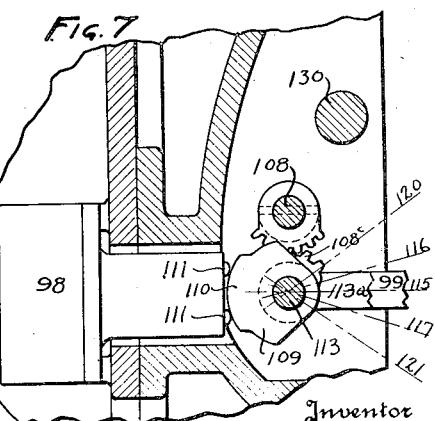

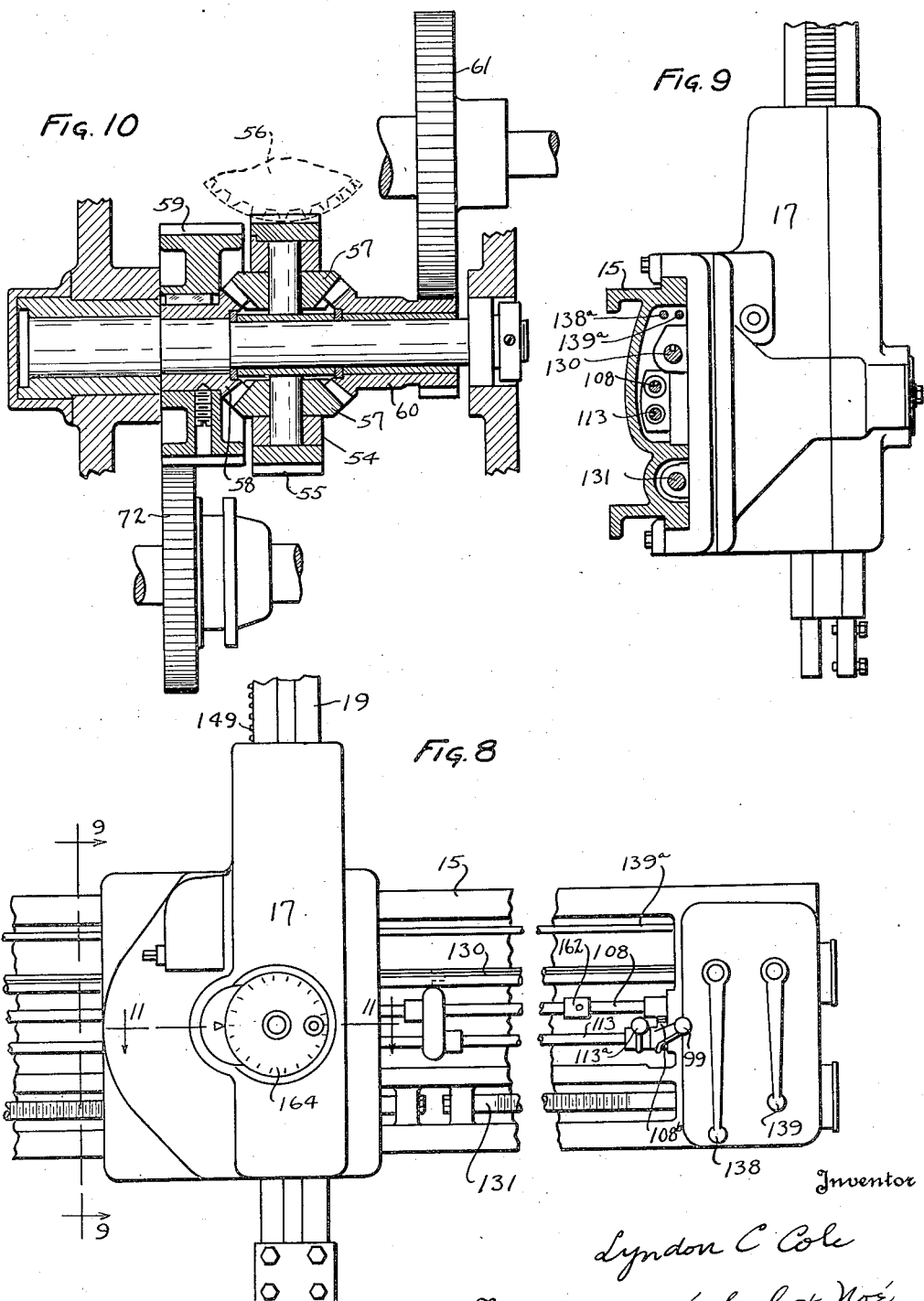

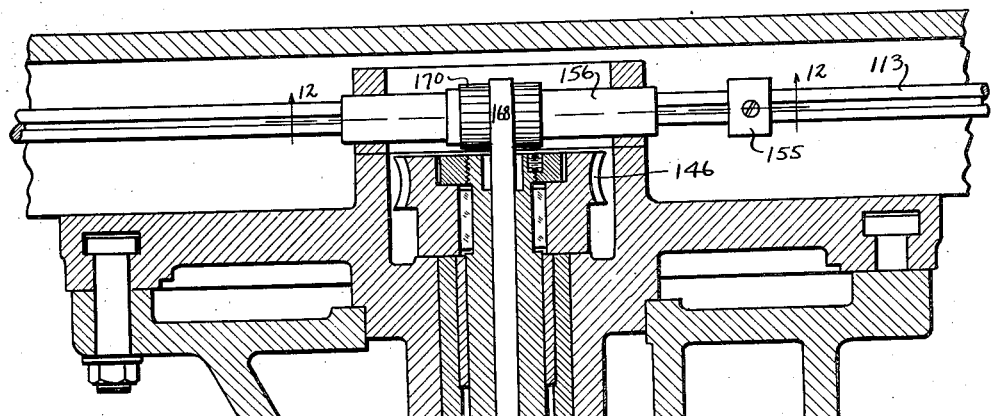
Fig. 11
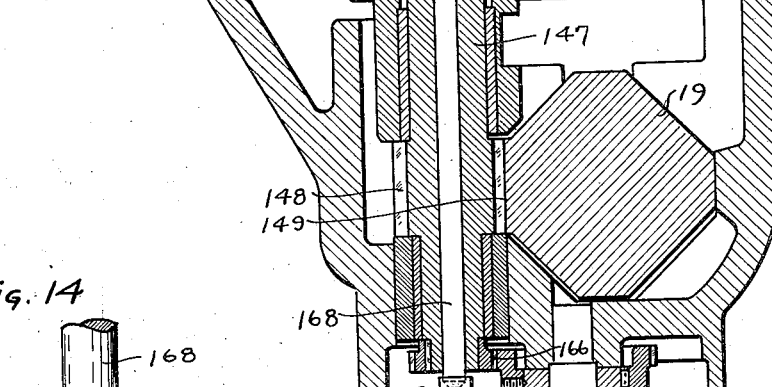
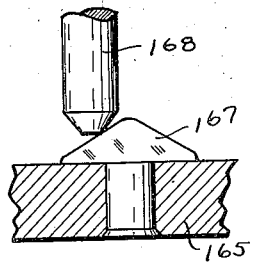
Fig. 14
Fig. 13
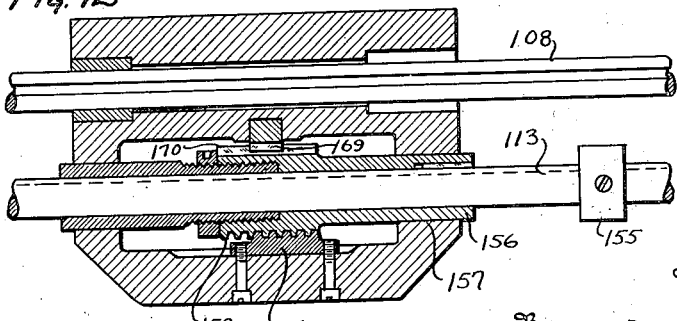
Fig. 12
Inventor
Lyndon C Cole
By Maréchal & Noé
Attorney

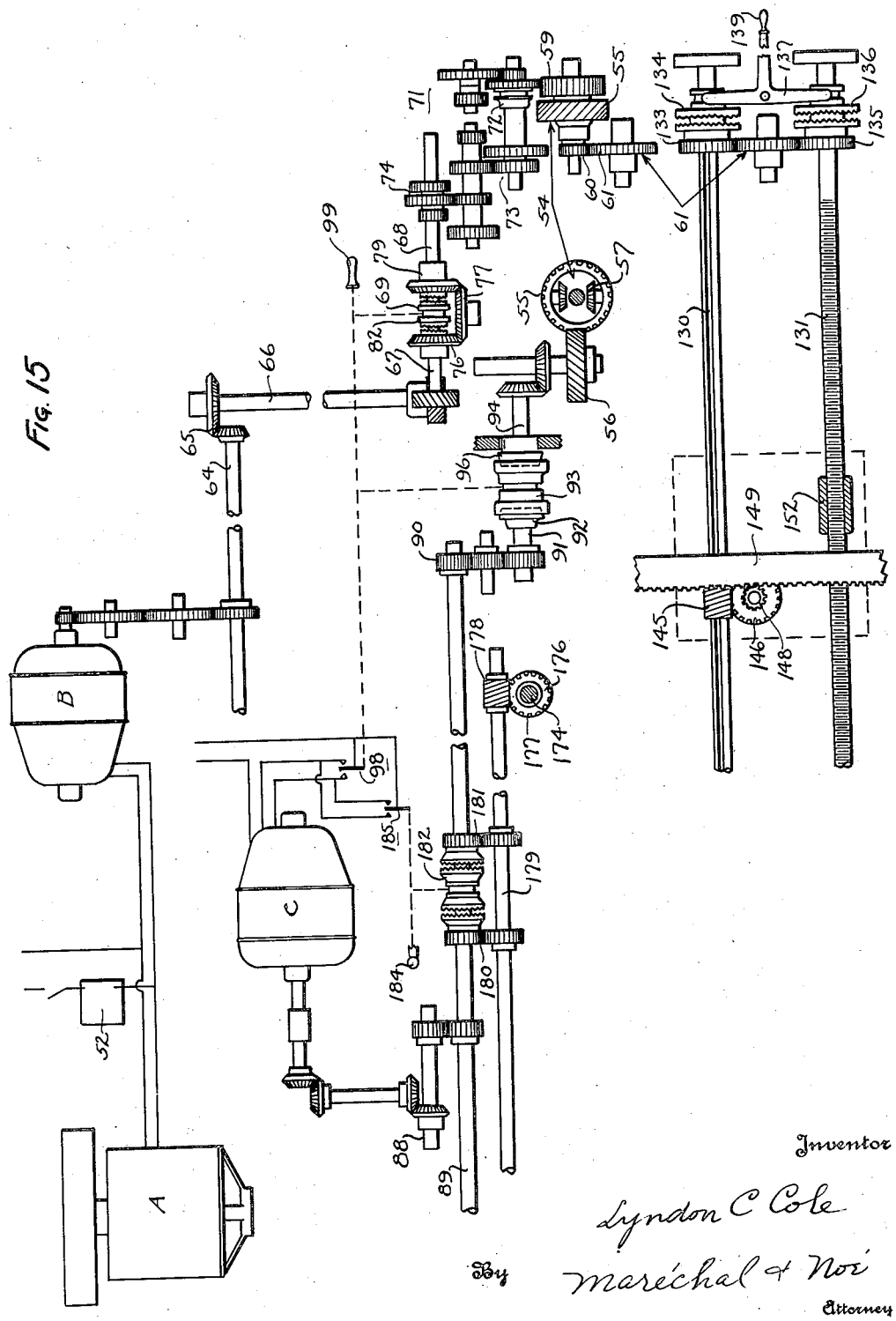

Patented Apr. 16, 1935

1,997,810

UNITED STATES PATENT OFFICE 1,997,810

MACHINE TOOL

Lyndon C. Cole, Hamilton, Ohio, assignor to General Machinery Corporation, Hamilton, Ohio, a corporation of Delaware Application February 8, 1932, Serial No. 591,574

5 Claims. (Cl. 77—4)

This invention relates to machine tools and more particularly to boring mills and the like.

One object of the invention is the provision of a machine tool of the character described having a rotatable work carrying table, the rotor of the driving motor by which the table is operated being secured or fixed to the table, all variations of table speed being effected by an electrical control.

Another object of the invention resides in the provision of a machine tool having a rotatable table to which is fixed the armature of the table driving motor, a separate motor being employed for feeding the tool carrying member, the speed of both motors being electrically controlled simultaneously and similarly by a common means.

Another object of the invention is the provision of a novel oiling arrangement for the rotatable table, the oil being circulated past bearing surfaces in a novel manner so as to effectively care for the large loads due to the weight of the table and to the heavy armature by which the table is driven.

Another object of the invention is the provision in a machine tool of the character described, of a novel arrangement of parts for effecting tool movements, a variable speed motor and a reversible motor being arranged to drive a combined feeding and traversing shaft, both motors supplying power to the shaft through a differential mechanism and both motors being under the control of the operator to permit variations in speed throughout the feeding speed range and to provide for rapid traverse.

Another object of the invention resides in the provision of a single control member or lever and mechanism operated thereby so that the speed of the combined feeding and traversing shaft may be increased from a feeding speed without moving through a neutral position to provide for rapid traverse movements of the tool carrying member.

A further object of the invention is the provision of a stop arrangement for stopping downward movements of the tool bar and for stopping lateral movements of the tool saddle, both stop devices being effective on a single manually controlled shaft or lever.

Still other objects and advantages of the invention will be apparent from the following description, the accompanying claims and the drawings, in which—

Fig. 3 is a horizontal section on the line 3—3 of Fig. 1, showing the details of the table bearing;

Fig. 4 is a vertical section on the line 4—4 of Fig. 3, showing the table drive and the bearing arrangement;

Fig. 5 is a vertical sectional view of the clutch arrangement, taken on line 5—5 of Fig. 2 through the right-hand end of the cross rail;

Fig. 6 is a section on the line 6—6 of Fig. 5, and shows a detail of the control parts;

Fig. 7 is a section on the line 7—7 of Fig. 6;

Fig. 8 is a front elevation on an enlarged scale showing the right-hand end of the cross rail and the left-hand saddle;

Fig. 9 is a section on the line 9—9 of Fig. 8;

Fig. 10 is a cross sectional view taken through the differential mechanism by means of which both the feeding motor and the table drive motor are connected to the combined feed and traverse shaft;

Fig. 11 is a horizontal section taken on the line 11—11 of Fig. 8, showing the operating parts for the tool bar;

Fig. 12 is a section on the line 12—12 of Fig. 11;

Fig. 13 is a detail view of the stop operated sleeve;

Fig. 14 is a detail view showing the cam arrangement for operating the stop rack; and Fig. 15 is a diagrammatic illustration of the driving control and tool moving system.

Figure 1:
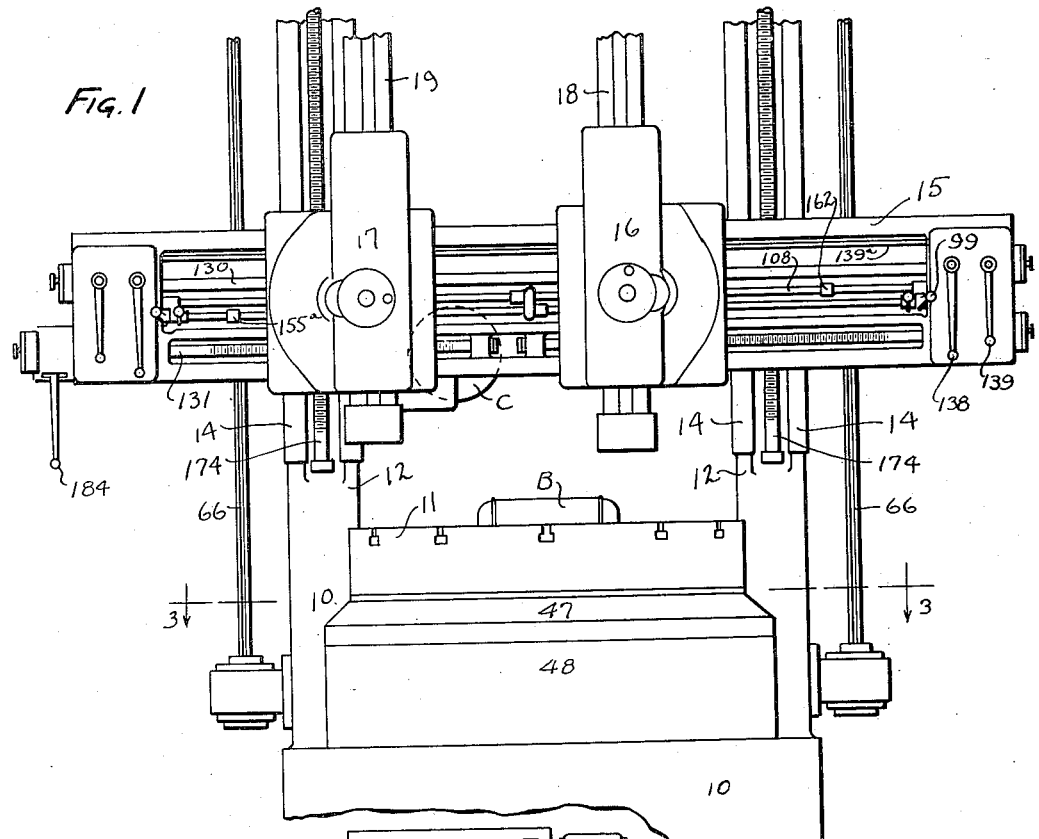
Fig. 1 is a front elevational view of a boring mill, embodying the present invention.

The invention as herein disclosed has been shown in its application to a boring mill, but it will be understood that the invention is applicable to machine tools of a similar character, and especially to machine tools in which the work is carried by a movable table while the tool or tools are moved at various speeds and in various directions by power means under the control of the operator. In the boring mill, as herein shown, there is a main frame structure or support 10, the lower portion of which rotatably supports the work carrying table 11. Spaced frame sides or standards 12 extend up from the base portion of the frame structure, the upper ends of these standards 12 being interconnected by a top arch. Vertically movable on the guides 14 with which the frame standards 12 are provided is a cross rail 15, extending from one side of the machine to the other and slidably supporting right and left-hand tool saddles 16 and 17. The two saddles carry the two tool bars 18 and 19 which are adapted to be moved vertically in the saddles. There is provision for effecting lateral movements of the two saddles and vertical movements of the tool bars in the saddles at any desired feeding speed; and also for rapidly traversing either the bars or the saddles, the drive means being under the control of the operator by a duplex control system so that the controls are within reach of an operator standing on either side of the machine.

The work supporting table of a boring mill is ordinarily driven by a motor through speed reducing gearing providing for various speeds of operation. In accordance with the present invention, however, the drive motor by which the table is moved is directly connected to it, no gearing being employed for the transmission of power to the table. Thus as shown in Fig. 4, the table 11 is fixed to a shaft or spindle 22 which extends downwardly into the base structure 23 of the frame 12. The table driving motor A embodies the armature or rotor 24 which is fixed directly to the shaft 22, and the stator or field 25 which is mounted directly in the base structure 23. The motor is of the variable speed type, variations in speed of from about 30 to 180 revolutions per minute, for example, being permitted by electrical control devices of any suitable character under the control of the operator.

The shaft 22 is rotatably supported at its upper end by antifriction bearings 27, mounted in the base structure 23, and the lower end of the shaft is supported in a roller bearing 28. The weight of the table is assumed by a plain surface bearing 29 embodying upper bearing face 30 and lower bearing face 31 respectively on the table and the base structure. One of these bearing faces is provided with radially extending passages, these passages being shown in the lower or fixed bearing face as indicated at 33. These passages extend from an annular groove or chamber 34 on the outer side of the bearing to a second groove or chamber 35 on the inner side of the bearing and permit the oil to flow during table movements through the passages and from one groove or chamber to the other. As the oil flows through these passages it is carried along by the bearing surfaces from one radial passage 33 to the next and when it reaches a succeeding radial passage it is carried along with the current of oil in a radial direction so that any one drop of oil is effective throughout a comparatively short period of time. The oil is forced to flow through the bearing from the inner groove 35 to the outer groove 34 and through the radial passages 33 by means of a suitable oil pump 37 driven by a motor 38, see Fig. 2. The oil flows from the pump through a purifier 39 and then through a pipe 40 shown in both Figs. 2 and 3, the pipe 40 extending below the table and having radial branch pipes or passages 42 which carry the oil to the inner groove 35. After passing through the bearing the oil is led from the outer groove 34 through the exit passage 43 to the cooling reservoir chamber 44 from which the oil is pumped. The oil pump may be employed for furnishing a suitable oil supply through the various other operating parts of the machine. The continuous flow of oil across and through the bearing surfaces of the table provides for effective oiling, and effectively takes care of the tremendous loads to which the table bearing is subjected, since the heavy table is also directly connected to and carries the very heavy motor armature 24. The amount of oil in the entire system is quite large in order that the heat generated in the bearings will be carried away by the oil and dissipated. The effective oiling arrangement of the table, and the manner in which the driving motor is directly connected to it, provides for very silent operation since no gears at all are employed in the drive, and provides for vibrationless movement of the table at any desired speed. As shown in Fig. 4, the supporting base structure is divided along the line 46 into upper and lower base members 47 and 48 respectively, these members being bolted securely together and thus providing for detachment of the upper member for ready removal of the table together with shaft 22 and the motor armature and upper bearing.

The table driving motor A is not employed to feed or traverse the tools. Such feeding and traversing movements are accomplished by a plurality of motors B and C, shown in Fig. 15 to which reference is now made. This figure shows diagrammatically the various driving, feeding, and traversing elements of the machine. Motor B is a variable speed electric motor, having a speed range of from 300 to 1800 R. P. M. for example. The speed of this motor is controlled simultaneously with the table driving motor A, both motors being electrically connected to a common control box 52 so that the speeds of both motors can be increased or decreased proportionate amounts in order that the feeding speed of the tool members is correlated to the speed of rotation of the table. The motor C is preferably a constant speed motor, of the reversible type, its speed being about 1200 R. P. M. for example. Both the motors B and C are connected through power transmitting mechanism to a differential mechanism designated generally by the numeral 54. This differential mechanism, which has been shown in detailed section in Fig. 10, may comprise any suitable differential gear 55 herein shown as having helical teeth in driving engagement with the gear 56 operated by the motor C, gear 55 carrying the bevel pinions 57 which mesh with bevel gear 58 on a driving gear 59 and which also mesh with a driven pinion 60 meshing with a gear 61. The shaft which supports either the gear pinion 60 or the gear 61 may be termed a combined feed and traverse shaft, and the gear 61 may likewise be so termed. The gear 61 will be operated at a speed dependent upon the speeds of both the motors B and C, since the motor B is connected to one element of the differential mechanism and the motor C is connected to the other element of the differential mechanism in order that power may be supplied from both motors, or from only one of the motors, as desired. Thus the motor B may be operated at various speeds while the motor C is stationary to provide for feeding speeds of any desired value, and with both motors operating a rapid traverse speed of the combined feed and traverse gear 61 is obtained.

Power is supplied from the motor B to the differential driving gear 59 through a gear train embodying a shaft 64 extending from one side of the machine to the other as shown in Fig. 3. At opposite ends of this shaft are bevel pinions 65 which provide for the operation of vertical shafts 66, one at each side of the machine. Each shaft 66 is geared to a shaft 67, as shown in Fig. 15, which operates a shaft 68 in either direction through a reversing mechanism 69. The shaft 68 may be selectively geared to the differential driving gear 59 to provide for any one of several selected speeds by means of a speed changing mechanism which is generally designated 71. As shown, this speed changing mechanism provides for a speed change of twelve different steps.

The speed changing mechanism is contained in the gear housing at the end of the cross rail, and is illustrated for example in Fig. 5. The selective movement of the gears may be controlled by handles or control members which move the several movable elements 72, 73 and 74 of the speed change mechanism in a desired manner.

The reversing mechanism designated generally 69 is also shown in more detail in Fig. 5. The driving shaft 67 of this reversing mechanism has loosely mounted on it a bevel pinion 76 which meshes with a bevel gear 77 freely rotatable in the gear casing 78. Gear 77 meshes with a driven pinion 79, and either the pinion 76 or pinion 79 may be clutched positively to the shaft 67 by means of clutch teeth 80 and 81 and the shifting clutch collar 82 which is keyed to the shaft 67. In this way the bevel pinion 79, which is secured to the shaft 68 may be operated in either desired direction. The reversing clutch collar 82 is operated preferably by a yielding spring bar 84 carried on a reversing lever 85.

Figure 2:
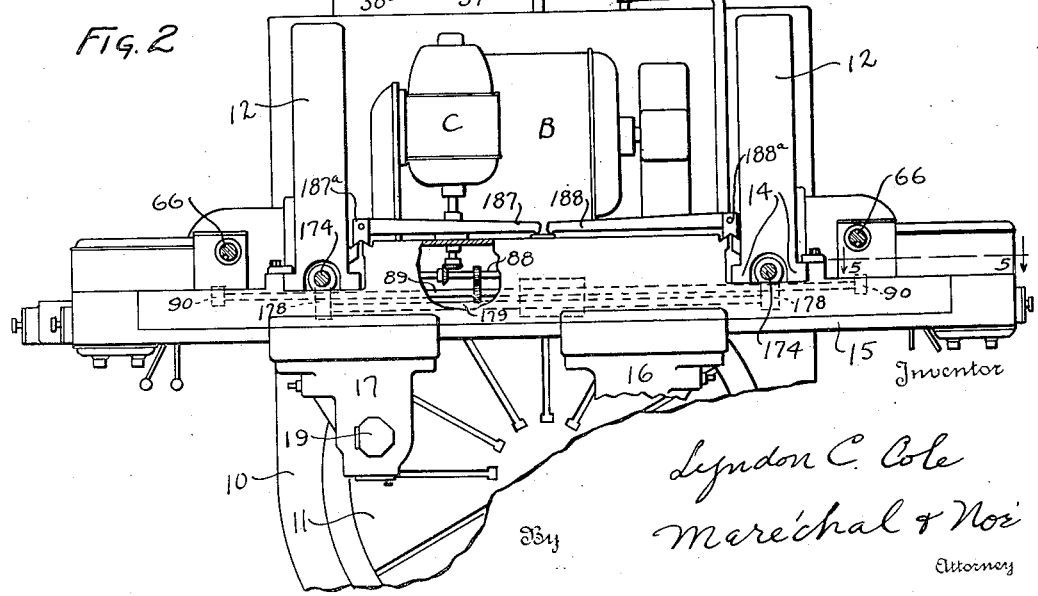
Fig. 2 is a top plan view of the boring mill.

The constant speed reversible motor C which is mounted on the cross rail, is geared to a transversely extending shaft 88 which is geared to a parallel shaft 89 extending along the cross rail from one side of the machine to the other as shown in Fig. 2. At opposite ends of the shaft 89 are driving pinions 90, and as shown in Fig. 15, the right-hand driving pinion 90 is geared to a shaft 91 carrying a friction clutch face 92. It will be understood that the driving mechanism at the left-hand side of the machine is the same as that illustrated. A driven clutch element 93 is secured to a shaft 94 which is geared to the differential driving gear 56, and the driven friction member 93 may be either moved into engagement with the driving clutch face 92 or into engagement with a stationary brake member 96. In this way the motor C may be connected to the differential driving gear 56, or this gear may be held stationary by direct connection to a brake at a time when the friction driving clutch is disengaged. The motor C is electrically controlled so that it may be reversed or started by means of the switch diagrammatically indicated at 98 in Fig. 15, this switch being connected so as to be operated by a manually controlled element 99. This element 99 is also connected to the reversing mechanism 69 so that as the rotation of the shaft 68 is reversed in direction, the reversible motor C will also be reversed in order that the supply of power through the differential mechanism to the combined feed and traverse gear 61 will be in the proper direction to give the desired direction of rotation to the gear 61. The control member 99 also controls the operation of the friction clutch and brake through which power is supplied from the motor C to the differential driving gear 56, the mechanical interconnections to these parts from control member 99 being shown by the dotted lines in Fig. 15.

Fig. 5 shows in detail a desired mechanical construction by which the reversing mechanism 69 is mechanically associated with the friction clutch and brake of the motor C. The control lever 85 by means of which the direction of rotation of the shaft 68 is reversed is operated by a roller controlled by a cam groove 101 in a rotatable drum 102. This drum also has a second cam groove 103 in which is a roller provided on the end of a clutch collar lever 104 which shifts the clutch sleeve 93 keyed to shaft 94 into engagement with either the clutch or the brake. The drum 102 (which is also shown in Fig. 6) is rotated by a segmental gear 106 meshing with a segment 107 on shaft 108. This shaft 108 is operated manually by the lever 99 which has already been referred to in connection with Fig. 15, and a pinion 108$^b$ rotatable freely on a shaft 113 which extends parallel to it, both shafts extending from side to side of the machine and constituting control shafts operable from either side of the machine. Shaft 113 is controlled by a lever 113$^a$ fixed directly to it. Each shaft 113 and 108 is provided with a cam 109 which operates a switch 98, the cams and switches being duplicated on opposite sides of the machine. Figs. 6 and 7 show the switch operated by the control shaft 108 through a pinion 108$^c$ which is freely rotatable on shaft 113. The controlling plungers 111 of the switch are held in by the lobe 110 on the cam, in the position of the parts shown. As indicated in Fig. 7, the shaft 113 may be moved from the neutral position 115 to the positions 116 and 117 for effecting feeding movements of the tool or saddle in either direction and when so moved the switch 98 is not energized and the reversing motor C remains stationary, the feed motor B supplying the entire power through the differential to the combined feed and traverse gear 61 which is mechanically associated with the tool saddles and the tool bars in a manner that will be more fully explained later.

The shaft 113 may be moved beyond the feed positions 116 and 117 into the positions 120 and 121 to effect rapid traverse movements of the tools. When moved into these traversing positions the switch 98 of the reversible motor C is operated, the motor C being started, and at the same time the mechanical connections from the shaft 108 or 113 to the clutch and brake mechanism 92 and 96 is so controlled as to release the brake and connect the motor C mechanically to the differential mechanism. In this way the speed of the driven gear 61 is immediately increased without stopping the feed motor B, which continues to supply power to the differential in a direction dependent upon the desired direction of the movement of the tool. Thus the tool may be started in its traversing movements at the end of a feeding operation without stopping the movement of the tool even for an instant and without moving through a neutral position. Moreover this change from a stationary tool condition to a feeding movement and then to a rapid traverse speed is accomplished by a single lever. The speed of the tool is instantly increased from a feeding speed to a traversing speed through the medium of a friction clutch which transmits the power without shock. Change from feeding to traversing is thus accomplished without engaging or disengaging a jaw or positive type of clutch. If the tool is being rapidly traversed and it is desired to slow down its speed to a proper feeding speed, the shaft 113 for example may be moved back to the positions 116 or 117 depending upon the desired direction of rotation, without stopping the tool, such movements causing the deenergization of the motor C and also disassociating it mechanically from the differential and at the same time connecting the element 56 of the differential to a brake so that the one portion of the differential will be securely held and the desired feeding speed assumed.

The manner in which the feeding and traversing movements of the gear 61 are transmitted to the bar and to the saddle is illustrated diagrammatically in Fig. 15. Extending along an upper portion of the rail is the keyed bar moving shaft 130, and extending along the lower side of the rail is the threaded saddle moving shaft 131, shafts 130 and 131 extending out to the center of the rail, as duplicate bar and saddle moving shafts are provided at the left-hand side of the machine. The bar moving shaft 130 rotatably carries a gear 133 which may be secured to the shaft by means of a clutch 134. The shaft 131 rotatably supports a second gear 135 which may be fixed to the shaft by means of a clutch 136. The two clutches are controlled by a lever mechanism 137, shown diagrammatically in Fig. 15, having a handle 139 which may be moved by the operator, see also Fig. 8. The lever 139 is movable to the right to start the saddle shaft 131 and to the left to start the bar shaft 130. The effect of the operation of the lever 139 is to clutch the bar operating shaft 130 or the saddle operating shaft 131 to the gears 133 and 135 respectively, these gears being constantly moved at the desired speed as both are engaged by the differentially driven gear 61 having its shaft located between the gears 133 and 135. As previously explained, the gear 61 is moved at any desired feeding speed or at traversing speed, and by means of the clutch operating lever 139 either the bar moving shaft 130 or the saddle moving shaft 131 may be operated.

The bar moving shaft 130 is provided with a longitudinally extending key slot and supports a drive worm 145 which is thus fixed to the shaft 130 against relative rotational movement but which can be moved along longitudinally. The worm 145 operates a worm wheel 146, illustrated in Fig. 11, and the worm wheel 146 is fixed to a driving shaft 147 carrying a gear 148 which meshes with a rack 149 on the side of the tool carrying bar 18. As the shaft 130 rotates at a desired feeding or traversing speed, the bar is elevated or moved down toward the table.

The saddle 16 is moved transversely along the cross rail 15 by the saddle operating shaft 131, which is threaded in a nut 152, fixed to the saddle. Thus when the screw 131 is rotated, the saddle is moved transversely in either direction and at any desired speed.

Adjacent the lever 139 is a lever 138 which is mechanically connected to a push rod or shaft 138a, see Figs. 8 and 9, and which merely transmits movement from lever 138 to the lever at the left-hand side of the machine which operates the left-hand lever mechanism 137. In this way the left-hand saddle and tool bar can be controlled from the right-hand side of the machine. Lever 139 is also controlled mechanically through the shaft 139a which extends to the left-hand side of the machine and is operated by a lever similar to lever 138.

Means are provided for arresting the movement of the tool bar or of the saddle at a limiting position to prevent injury to the machine and to make its control foolproof. This means comprises adjustable stops secured on the control shafts 108 and 113. Stop 155 on shaft 113 provides for the control of the left-hand saddle in one direction. As shown in Figs. 11 and 12 this stop 155 is adapted to be engaged by the right-hand side of a sleeve 156 mounted loosely on the shaft 113 for endwise movement but keyed to it. The shaft 156 can move endwise and also rotate in a bearing 157 provided in the tool saddle, but such movements are controlled by helical gear teeth 159 provided on one-half of the sleeve and which mesh with teeth 160 fixed with respect to the saddle. Considering Fig. 12, if the saddle is moved toward the right the sleeve 156 will be brought into engagement with the stop 155 and as it then continues to move to the right, the sleeve 156 is forced a little distance to the left in its bearings 157 causing rotational movement of the sleeve, therefore rotating the control shaft 113 and moving it back to a neutral position. This automatically stops the saddle at a desired limiting position and prevents injury that might be caused by neglect on the part of the operator. A similar stop 155a is provided on the other side of the saddle on the shaft 113. In the same manner stops 162 are provided on the control shaft 108 for the control of the right-hand saddle 18.

The control shaft 113 for the left-hand saddle and tool bar is also automatically controlled by a stopping device which prevents downward travel of the left-hand tool bar beyond a desired definite limiting position. The amount of downward travel of the tool bar may be determined by a scale on an adjustable plate 164 which may be adjustably clamped to a ring 165, geared at 166 to the shaft 148 by means of which vertical movement of the tool is effected. The ring 165 carries a cam projection 167, shown in Fig. 14, and after a predetermined amount of travel of the shaft 148, resulting in a predetermined downward travel of the tool bar 18, the cam 167 is brought into engagement with a push rod 168, forcing the push rod rearwardly. At its rear end, the push rod is provided with rack teeth 169 meshing with spur teeth 170 on the sleeve 156, the spur teeth 170 being provided on the opposite side of the sleeve from the helical teeth 159. In this way, after a predetermined downward travel of the bar, the push rod 168 causes rotational movements of the sleeve 156 and thus rotates the control shaft 113 so as to move the shaft into a neutral position and interrupt the supply of power to the bar operating shaft 130.

The motor C which is effective during traverse movements of the bars or saddles, is also employed for raising or lowering the entire cross rail on the supporting standards or sides 12. On each standard is a fixed threaded shaft 174 carried between the opposed guide slides 14. Rotatably supported in the cross rail is a nut 176, see Fig. 15, the outer surface of the nut having helical gear teeth 177 meshing with teeth 178 on a helical gear on shaft 179 which extends parallel to the shaft 89 and which may be driven from the shaft 89 by means of two gear trains 180 and 181 and a clutch 182. When the clutch sleeve is in its neutral position as shown in Fig. 15, the shafts 89 and 179 are not connected but when it is moved in either direction from its normal position, the shaft 179 will be geared directly to the shaft 89, causing it to rotate so that the cross rail can be raised or lowered. Operation of the clutch collar 182 is under the control of a lever 184 which also operates a reversing switch 185 so that the desired direction of rotation of the shaft 179 can be obtained. The switch 185 permits the motor C to be energized independently of the control lever 99, so that the rail may be moved up or down regardless of the operation of the motor B. Lever 184 is preferably so arranged that forward and rearward swinging movements mechanically operate wedge locking levers 187 and 188 which hold the cross rail to the saddle by the wedges 187a and 188a. After releasing the wedge lock the lever 184 may be swung laterally in either direction depending on the desired direction of movement of the cross rail.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a boring mill, a frame, a horizontal rotatable table, means for rotatably supporting said table for movement about a vertical axis, said table having a depending shaft fixed thereto, a motor armature fixed to said shaft, a motor field fixed to said supporting means, and means controlling the speed of said motor to control the speed of operation of the table.

2. In a boring mill of the character described, a rotatable work table arranged for rotation about a substantially vertical axis, a shaft fixed to said table, supporting means for said table comprising a base section and a top section removably fixed thereto, bearing means in said top section for said shaft and a motor for rotating said table having a movable motor element fixed to said shaft and removable bodily with said shaft and top section.

3. In a boring mill of the character described, a rotatable work table arranged for rotation about a substantially vertical axis, a shaft fixed to said table, supporting means, antifriction bearing means provided in said supporting means for opposite ends of said shaft, a motor for rotating said table comprising a movable motor element fixed to said shaft and a stationary motor element fixed to said supporting means below the table, said supporting means and table having cooperating bearing surfaces for supporting the weight of the table.

4. In a boring mill, a frame, a work supporting table, means rotatably supporting said table on said frame on a vertical axis, a motor having an armature fixed to said table, a tool carrying member movably supported on said frame, a feed motor, a connection therefrom to said tool carrying member, and means for simultaneously and similarly varying the speed of said motors.

5. In a boring mill of the character described, a horizontal rotatable work supporting table, a table driving motor having an armature fixed to said table, a combined feed and rapid traverse shaft, a tool carrying member controlled by said shaft, a variable speed feed motor, a third motor, means for simultaneously controlling the speed of the table driving motor and said feed motor, and differential mechanism connecting said feed motor and said third motor together and to said shaft.

LYNDON C. COLE.